United States Patent [19]

Sekita et al.

[11] Patent Number: 5,253,113
[45] Date of Patent: Oct. 12, 1993

[54] WIDE-ANGLE ZOOM LENS HAVING FIVE LENS UNITS

[75] Inventors: Makoto Sekita, Tokyo; Akihiro Nishio, Kanagawa, both of Japan

[73] Assignee: Canon Kabushiki Kaisha, Tokyo, Japan

[21] Appl. No.: 754,033

[22] Filed: Sep. 3, 1991

[30] Foreign Application Priority Data

Sep. 7, 1990 [JP] Japan .................................. 2-238188

[51] Int. Cl.[5] .................. G02B 9/60; G02B 13/04; G02B 15/14; G02B 15/20
[52] U.S. Cl. ................................ 359/680; 359/682
[58] Field of Search ............... 359/680, 681, 682, 683, 359/676

[56] References Cited

U.S. PATENT DOCUMENTS

| 4,991,942 | 2/1991 | Fujibayashi et al. | 350/423 |
| 5,000,550 | 3/1991 | Takahashi et al. | 359/680 |
| 5,056,900 | 10/1991 | Mukaiya et al. | 350/427 |

FOREIGN PATENT DOCUMENTS

| 49-23912 | 6/1974 | Japan . |
| 57-163213 | 10/1982 | Japan . |
| 389307 | 9/1933 | United Kingdom . |

Primary Examiner—David Mis
Attorney, Agent, or Firm—Fitzpatrick, Cella, Harper & Scinto

[57] ABSTRACT

A wide-angle zoom lens comprising five lens units of negative, negative, positive, negative and positive refractive powers in this order from the object side, zooming from the wide-angle end to the telephoto end being performed by moving the second lens unit so as to have a locus convex toward the image side and moving the third and fifth lens units toward the object side.

11 Claims, 7 Drawing Sheets

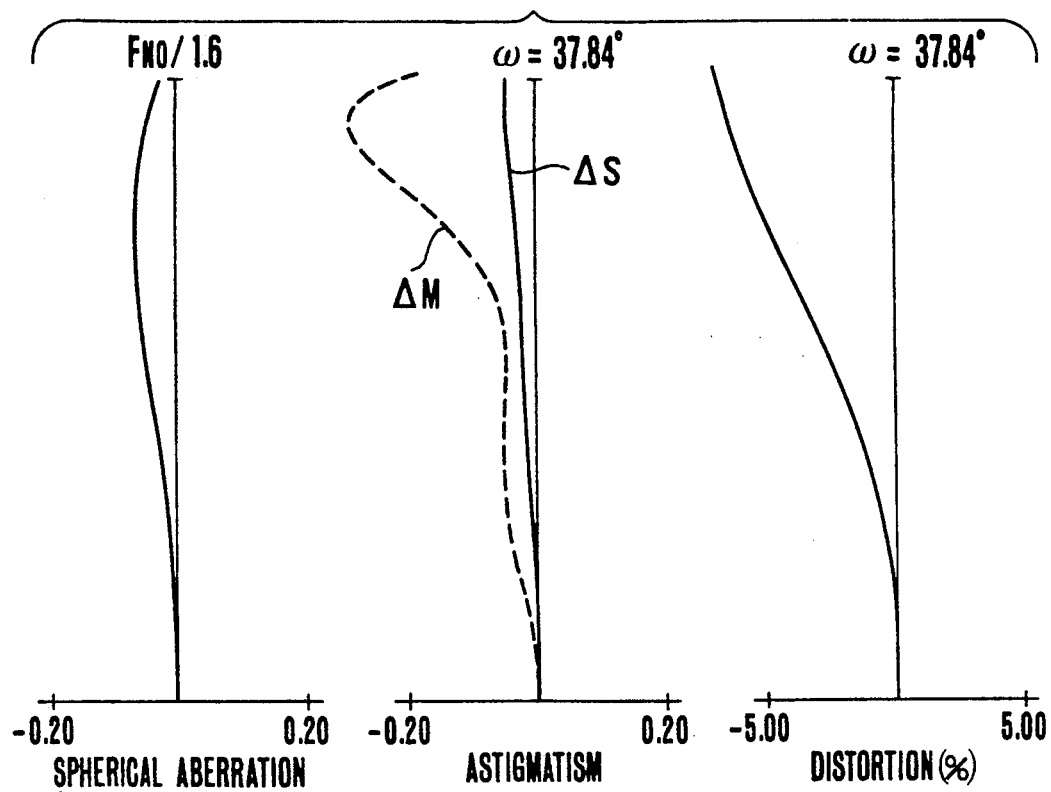
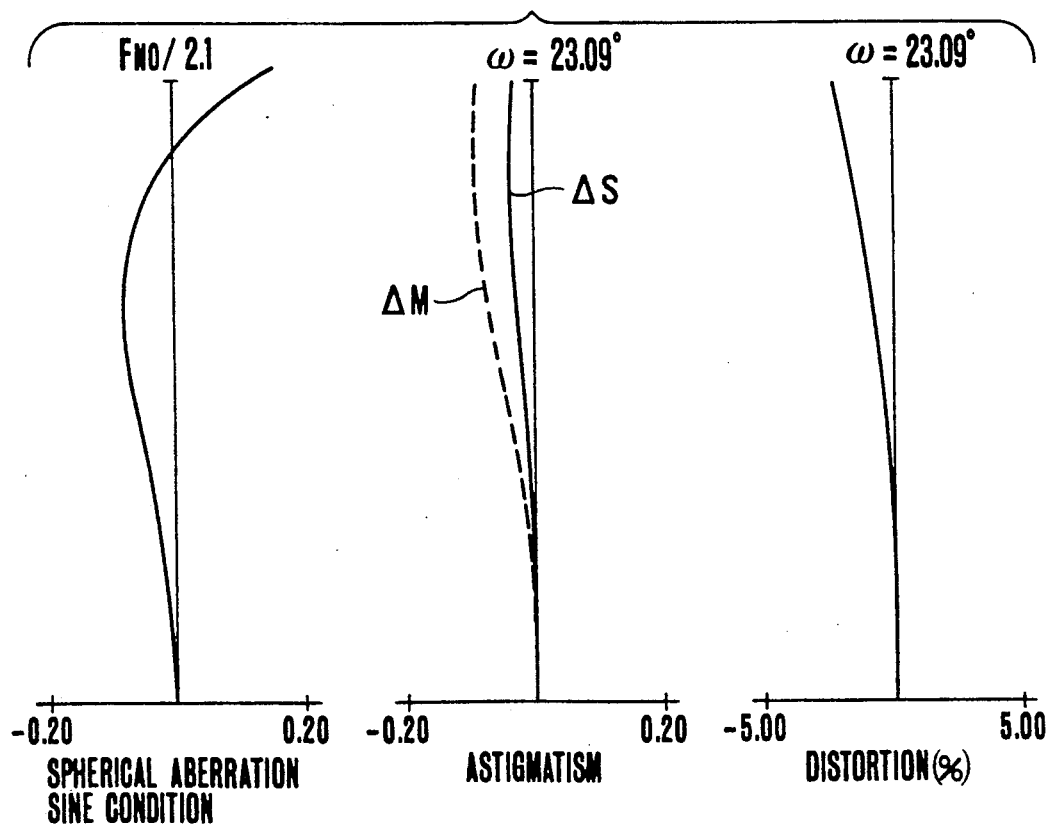

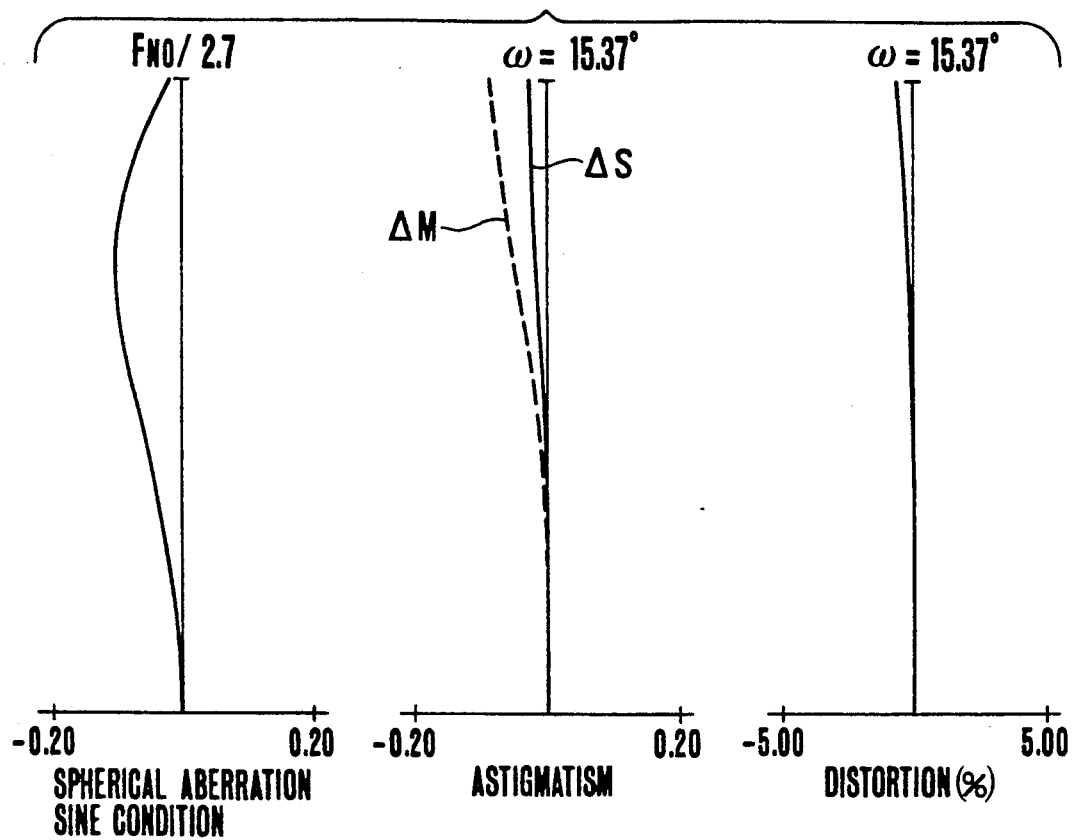

WIDE-ANGLE ZOOM LENS HAVING FIVE LENS UNITS

BACKGROUND OF THE INVENTION

1. Field of the Invention

This invention relates to wide-angle zoom lenses suited to cameras for photography, video cameras and SV (still video) cameras, etc. and, more particularly, to a wide-angle zoom lens having five lens units as a whole in which a lens unit of negative refractive power leads, the size of the entire lens system being made minimum by properly setting the lens arrangement of these five lens units.

2. Description of the Related Art

In a zoom lens of the so-called negative lead type in which a lens unit of negative refractive power leads, it is relatively easy to widen the angle of view. For this reason, the negative lead type has been used in many wide-angle zoom lenses having an angle of view of more than 70°. For example, in Japanese Patent Publication No. Sho 49-23912, Japanese Laid-Open Patent Application No. Sho 57-163213, etc., there is proposed a zoom lens having four lens units, i.e., in the order from the object side, a first lens unit of negative refractive power, a second lens unit of positive refractive power, a third lens unit of negative refractive power and a fourth lens unit of positive refractive power, wherein when zooming from the wide-angle end to the telephoto end, the first lens unit is made to move toward the image side, the second lens unit and the fourth lens unit are made to move toward the object side, and the third lens unit is made to be stationary or to move.

Further, in, for example, Japanese Laid-Open Patent Application No. Sho 58-50327 and British Patent No. 398307, etc., there is proposed a zoom lens having three lens units, i.e., in the order from the object side, a first lens unit of negative refractive power, a second lens unit of positive refractive power and a third lens unit of negative refractive power, of which at least two lens units are made to move to perform variation of the magnification.

In general, in a zoom lens, a first lens unit on the object side is frequently made to be large in the lens outer diameter and in weight. Therefore, in a camera in which the operation of varying the magnification is manually performed, such as a single-lens reflex camera for 35 mm silver-halide film, even if the variation of the magnification is of the type that the first lens unit is moved when varying the magnification, there is not much problem on mechanism.

However, in a camera of the power zoom type in which variation of the magnification is performed by electric drive, such as a video camera, the type of magnification variation in which the first lens unit of large weight is moved when varying the magnification necessitates a drive means using an electric motor of large size, etc. Also, in the points of electric power consumption and space, a problem arises in that the whole camera comes to increase in size.

SUMMARY OF THE INVENTION

An object of the present invention is to provide a wide-angle zoom lens which, as the zoom lens is of the negative lead type wherein a lens unit of negative refractive power leads, employs a type of magnification variation in which the first lens unit is made stationary when varying the magnification and, at the same time, while making small the size of the whole lens system by properly setting the amount of movement, the refractive power, etc. of each lens unit, has angles of view of 76° to 31°, a ratio of magnification variation of 3, an F-number of about 1.6 to 2.7, and a high optical performance over the entire range of variation of the magnification.

The wide-angle zoom lens according to the invention has, in the order from the object side, a first lens unit of negative refractive power, a second lens unit of negative refractive power, a third lens unit of positive refractive power, a fourth lens unit of negative refractive power and a fifth lens unit of positive refractive power, wherein when varying the magnification from the wide-angle end to the telephoto end, the second lens unit is made to move so as to have a locus of convex shape toward the image side, the third lens unit and the fifth lens unit are made to move monotonously toward the object side, and the fourth lens unit is made to be stationary or to move monotonously toward the object side.

BRIEF DESCRIPTION OF THE DRAWINGS

FIGS. 5(A), 5(B) and 5(C), FIGS. 6(A), 6(B) and 6(C) and FIGS. 7(A), 7(B) and 7(C) are graphs of the various aberrations of the numerical examples 1 to 3 of the invention.

In the graphs of the aberrations, FIGS. 5(A), 6(A) and 7(A) represent the wide-angle end, FIGS. 5(B), 6(B) and 7(B) an intermediate, and FIGS. 5(C), 6(C) and 7(C) the telephoto end.

Figure 1:
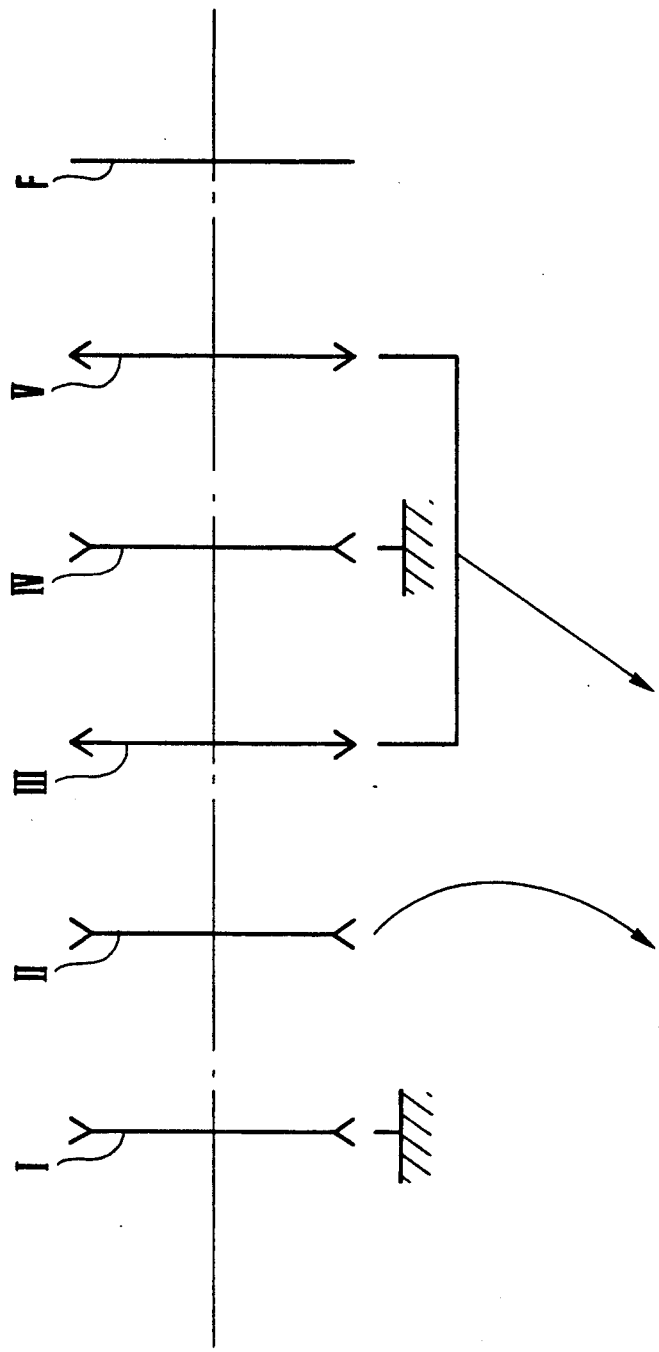
FIG. 1 is a diagram for explaining the paraxial refractive power arrangement of the wide-angle zoom lens according to the invention.

In the drawings, I denotes the first lens unit, II the second lens unit, III the third lens unit, IV the fourth lens unit, V the fifth lens unit, SP the stop, $\Delta M$ the meridional image surface and $\Delta S$ the sagittal image surface.

DETAILED DESCRIPTION OF THE PREFERRED EMBODIMENTS

Figure 2:
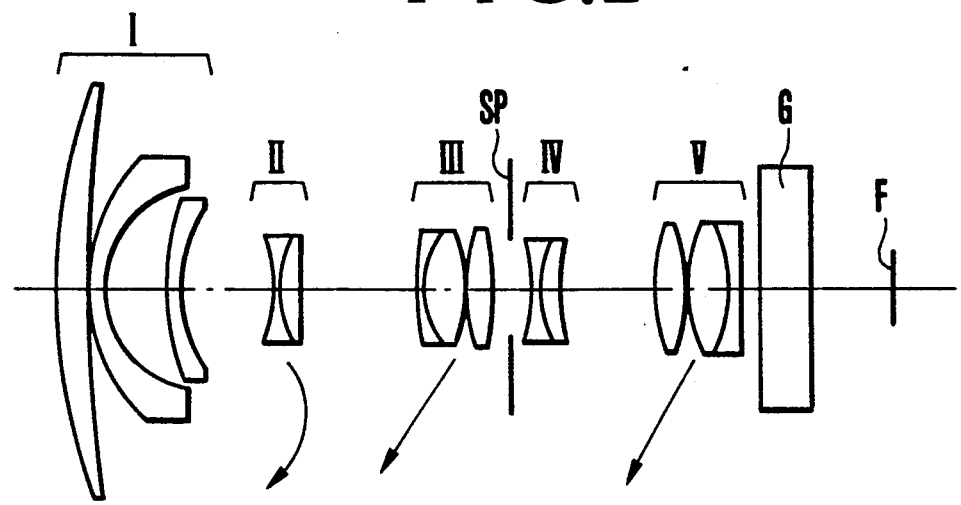
FIG. 2 to FIG. 4 are sectional views of numerical examples 1 to 3 of lens of the invention in the wide-angle end.
Figure 3:
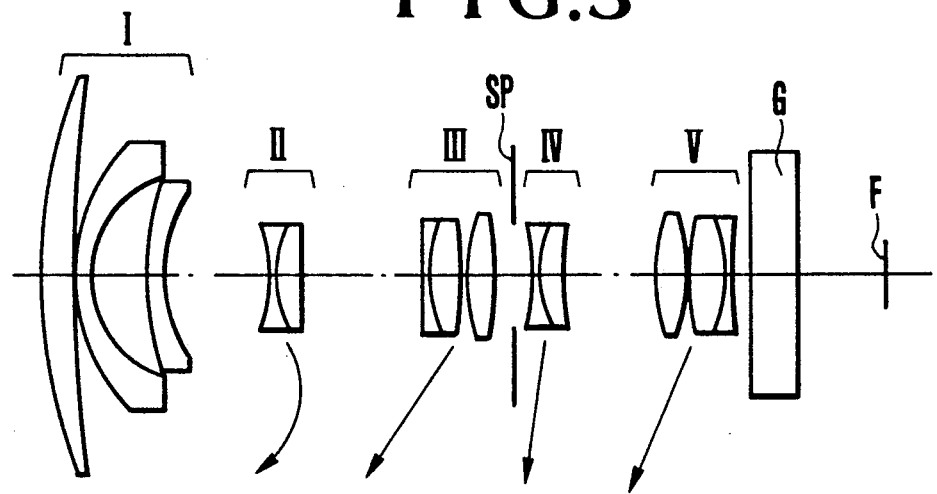
Figure 4:
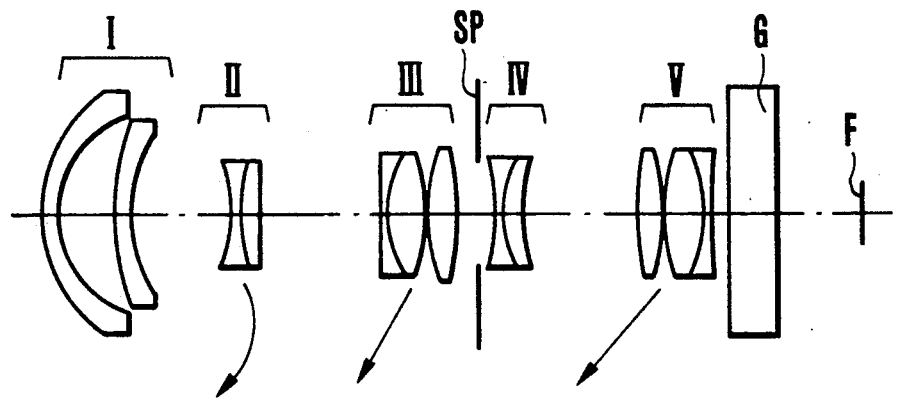
Figure 5A:
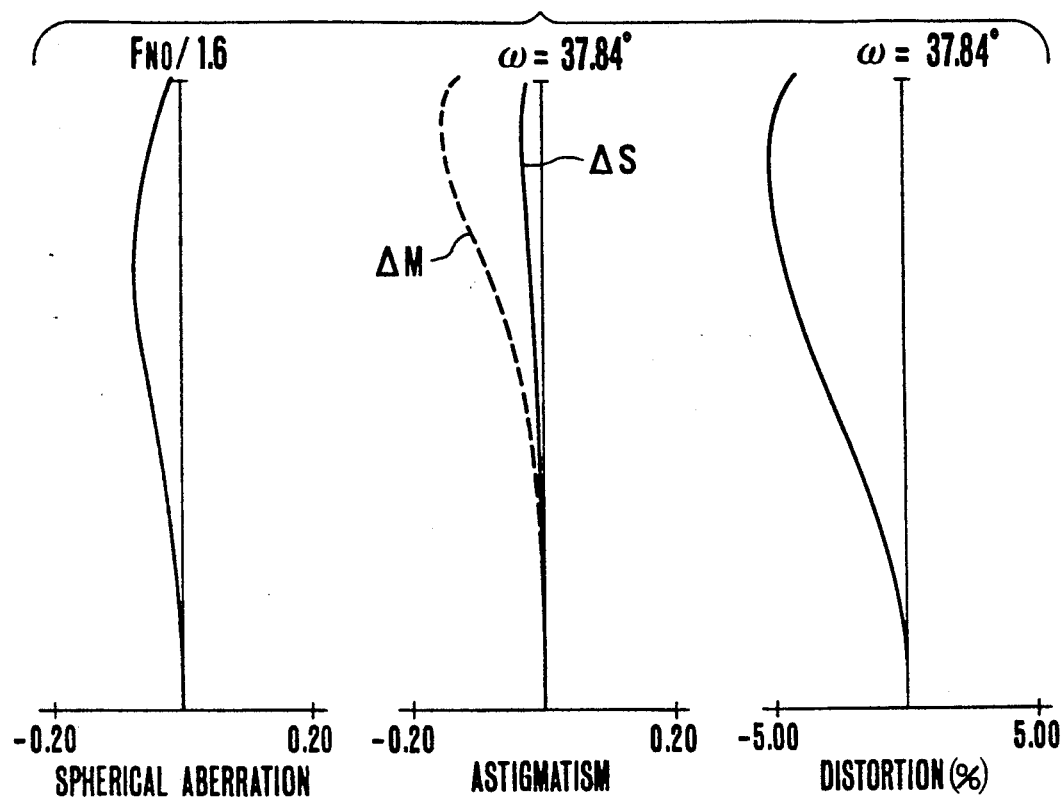
Figure 5B:
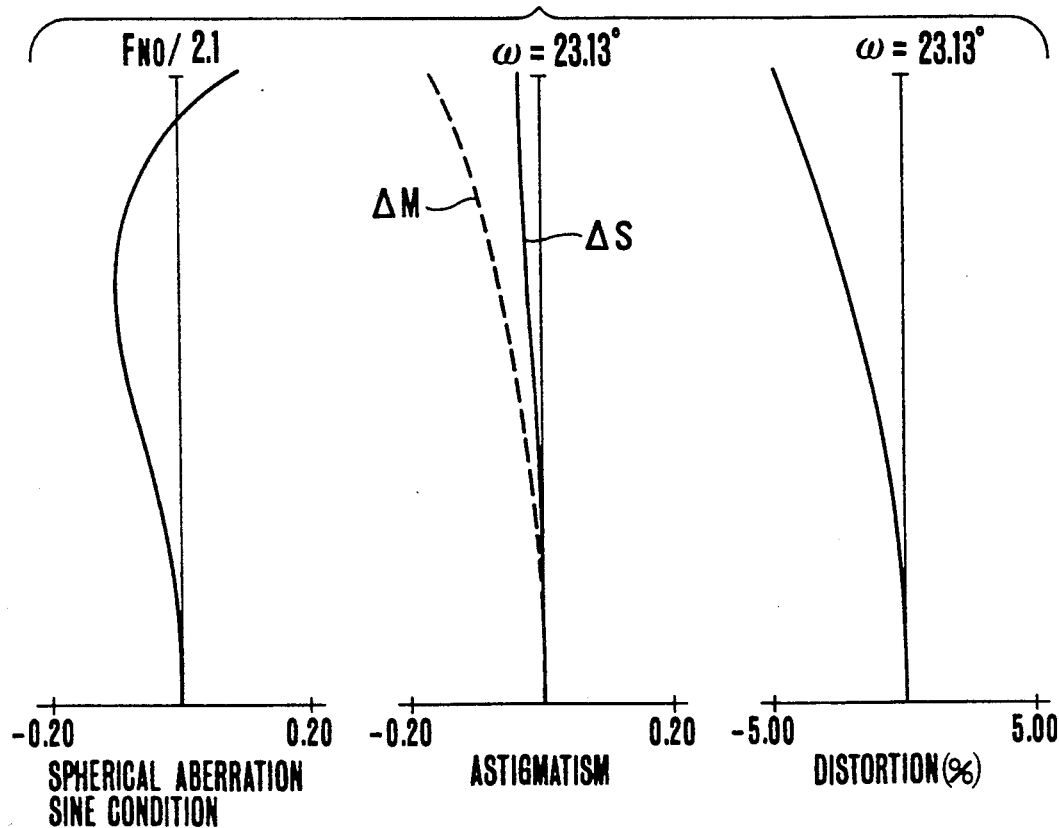
Figure 5C:
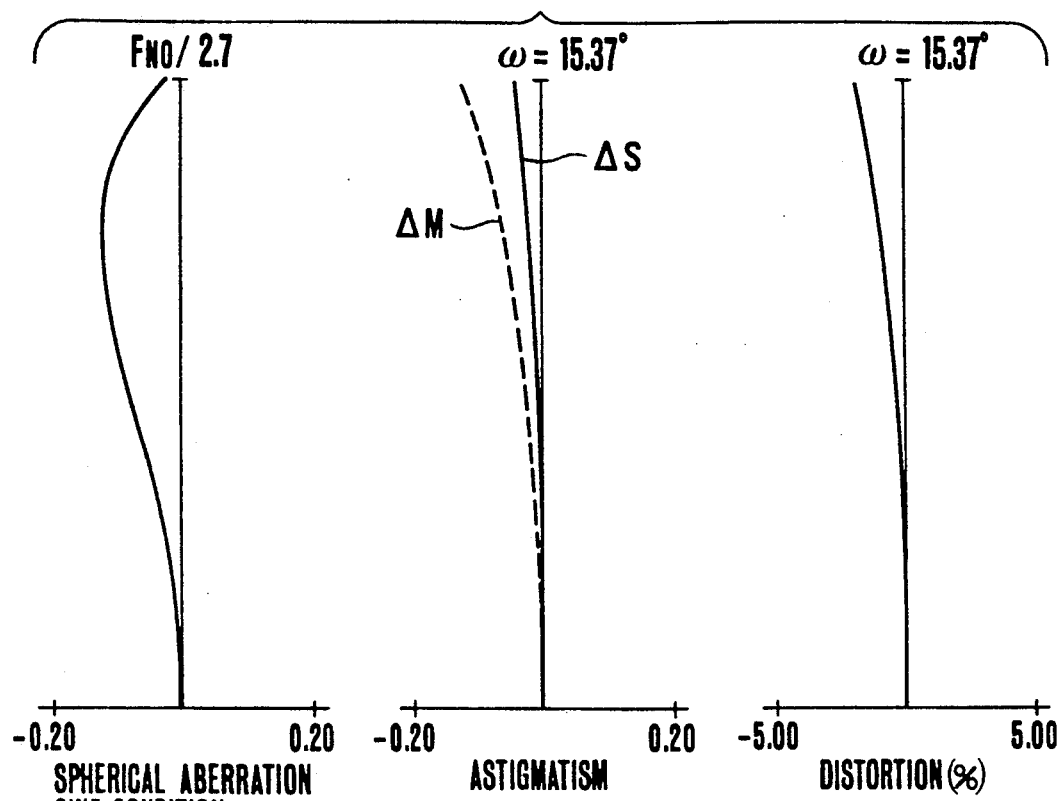
Figure 6A:
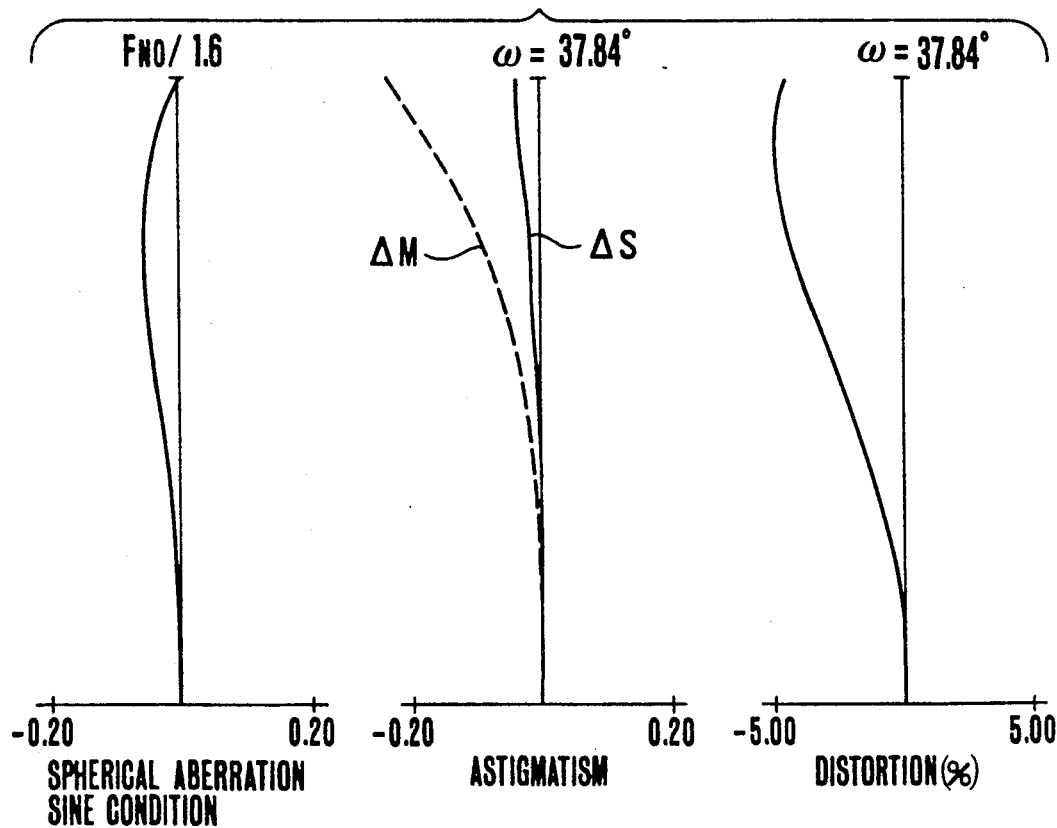
Figure 6B:
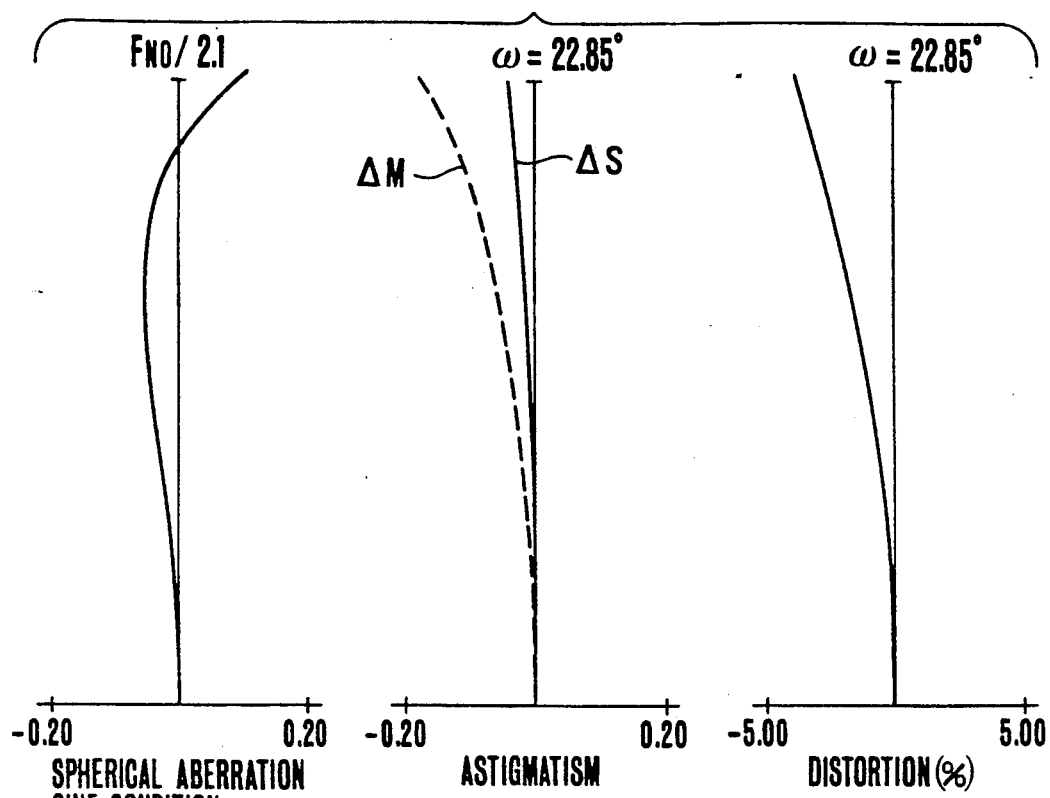
Figure 6C:
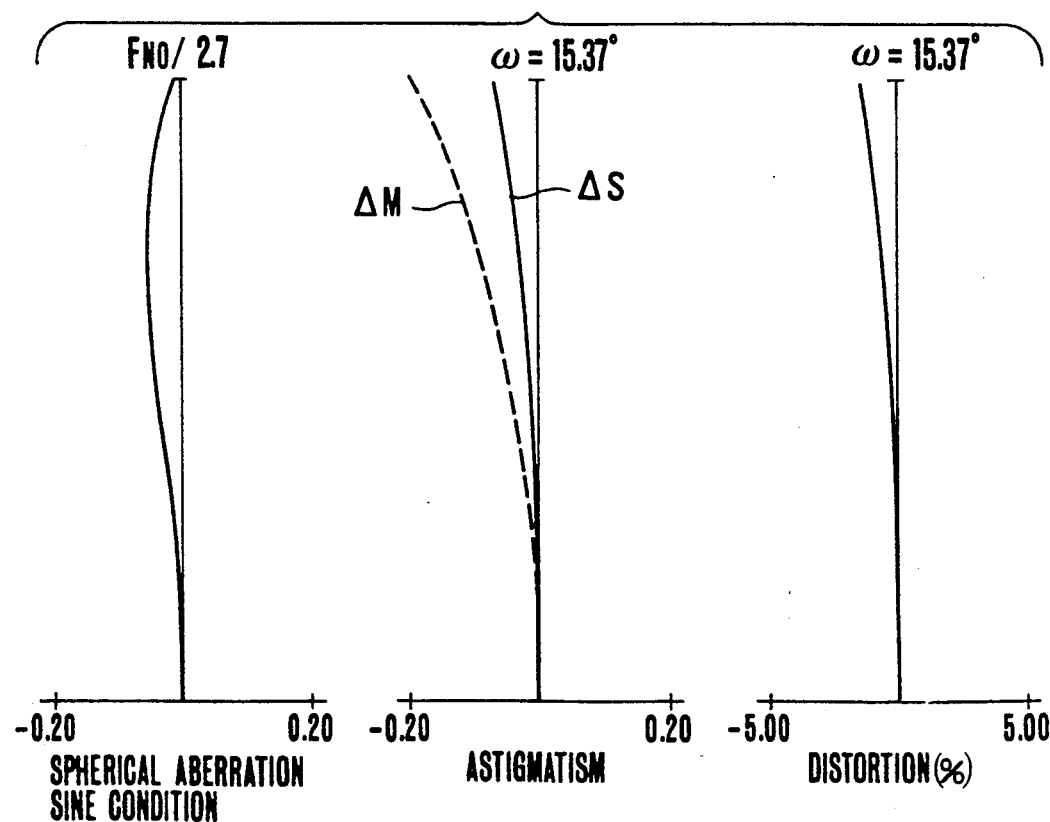

FIG. 1 is a diagram for explaining the paraxial refractive power arrangement of the wide-angle zoom lens of the invention. FIG. 2 to FIG. 4 are sectional views of the numerical examples 1 to 3 of lenses of the invention.

In the drawings, I denotes the first lens unit of negative refractive power, II the second lens unit of negative refractive power, III the third lens unit of positive refractive power, IV the fourth lens unit of negative refractive power and V the fifth lens unit of positive refractive power. SP stands for the stop, G for a glass block such as infrared cut filter, etc., and F for the image plane. Arrows represent the loci of movement of the lens units when varying the magnification from the wide-angle end to the telephoto end.

In the present embodiment, as shown in FIG. 1, when varying the magnification from the wide-angle end to the telephoto end, the first lens unit is made stationary, and the second lens unit is made to move so as to have a locus of convex shape toward the image side, so that the shift of the image plane with variation of the magnification is compensated for. Also, the third lens unit and the fifth lens unit are made to move monotonously toward the object side independently or integrally with each other, so that the magnification is varied. The fourth lens unit, in the first and third numerical examples shown in FIGS. 2 and 4, is made stationary and, in the second numerical example shown in FIG. 3, is made to move toward the object side intergrally with the stop SP. Also, during focusing, the first lens unit is made to move.

In the present embodiment, by employing the type of magnification variation in which, when varying the magnification, the first lens unit of large weight is made stationary, and, among the second lens unit and those that follow of relatively small weight, a plurality of lens units are made to move as has been described above, the load on a drive means using an electric motor for magnification variation, etc. is lessened. Also, the first lens unit is made to have only the focusing function. By this, a simplification of the lens barrel is attained.

In the present embodiment, letting the focal length of the i-th lens unit be denoted by fi, the focal length of the entire lens system in the telephoto end by FT, and the amount of movement of the i-th lens unit during the variation of magnification from the wide-angle end to the telephoto end by Xi, arrangement is made by satisfying the following conditions:

$$0.5 < |f1/FT| < 2 \quad (1)$$

$$0 \leq X4/X3 < 1 \quad (2)$$

$$0.5 < X5/X3 < 2 \quad (3)$$

By setting the refractive power of each lens unit and the amount of movement of each lens unit for magnification variation from the wide-angle end to the telephoto end in such ways, a minimization of the size of the whole lens system whole is attained while securing a predetermined ratio of variation of the magnification.

Next, the technical significance of each of the above-described inequalities of conditions is explained.

The inequalities of condition (1) are concerned with the negative refractive power of the first lens unit and have an aim chiefly to minimize the outer diameter of the lenses of the first lens units, while well correcting spherical aberration.

When the negative refractive power of the first lens unit is too strong as exceeding the lower limit of the condition (1), the amount of movement of the first lens unit during focusing becomes small so that the entirety of the lens system can be minimized in bulk and size, but spherical aberration becomes over-corrected on the telephoto side. When the negative refractive power of the first lens unit is too weak as exceeding the upper limit, the required amount of forward movement for focusing of the first lens unit becomes large. To secure the predetermined value of the marginal light amount, the diameter of the lenses of the first lens unit must be increased largely. So, it is no good.

The inequalities of conditions (2) and (3) give proper ranges for the ratios of the amounts of movement of the third, fourth and fifth lens units when varying the magnification from the wide-angle end to the telephoto end and have an aim to achieve aberration correction of good balance over the entire range of variation of the magnification, while attaining the minimization of the size of the whole lens system. It should be noted that, in the inequalities of condition (2), "X4/X3=0" corresponds to the case where, as the fourth lens unit is stationary, the amount of movement X4 takes "0".

When the lower limit of the condition (2) is exceeded, or when the movements of the fourth lens unit and the third lens unit are directed opposite to each other, the total length of the zoom lens comes to increase. So, it is no good. When the upper limit is exceeded, the required refractive power of the third lens unit for securing the predetermined ratio of magnification variation comes to strengthen relatively. Accordingly, it becomes difficult to effectively correct variation of spherical aberration and astigmatism along with variation of the magnification.

When the lower limit of the condition (3) is exceeded, it becomes difficult to obtain a predetermined value of the back focal distance in the wide-angle end. It also becomes hard to properly correct distortion. When the upper limit is exceeded, variation of spherical aberration along with variation of the magnification becomes large and the total length of the zoom lens tends to increase. So, it is no good.

The wide-angle zoom lens according to the invention is achieved by satisfying all the conditions described above. Further, to make it easy to increase the maximum angle of view and to obtain a good optical performance over the entire range of variation of the magnification, the following various conditions are preferably satisfied:

$$4 < |f2/FW| < 8 \quad (4)$$

$$3 < |f4/FW| < 6 \quad (5)$$

where FW is the focal length of the entire lens system in the wide-angle end.

The inequalities of condition (4) are concerned with the negative refractive power of the second lens unit. When the refractive power is too strong as exceeding the lower limit, it is particularly on the telephoto side that coma increases largely and spherical aberration comes to be over-corrected. When the refractive power is too weak as exceeding the upper limit, the amount of movement of the second lens unit with variation of the magnification increases largely, so that the gradient of the curve line of a zooming cam comes to be steep. So, it is no good.

The inequalities of condition (5) are concerned with the negative refractive power of the fourth lens unit. When the refractive power is too strong as exceeding the lower limit, it becomes difficult to properly correct distortion and coma on the wide-angle side. When the refractive power is too weak as exceeding the upper limit, the total length of the zoom lens comes to increase largely. So, it is no good.

In the present invention, to reduce the range of variation of aberrations with focusing, while reducing the number of lenses of the first lens unit, it is preferable to apply an aspheric surface of such shape that the positive refractive power gets progressively stronger toward the marginal portion of the lens to at least one lens surface in the first lens unit, particularly one of the lens surfaces of the lens on the object side.

Further, to lessen the aberration variation particularly with focusing, the first lens unit is preferably constructed either with, in the order from the object side, a positive lens and two negative lenses of meniscus shape having respective convex surfaces facing the object side, totaling three lenses, or with two negative lenses of meniscus shape having respective convex surfaces facing the object side, totaling two lenses.

Also, to lessen the aberration variation particularly with variation of the magnification, it is preferable that the third lens unit is constructed with a cemented lens composed of a negative lens and a positive lens, and a positive lens, totaling three lenses, the fifth lens unit is constructed with a positive lens and a cemented lens composed of a positive lens and a negative lens, totaling three lenses, and the second lens unit is constructed with a cemented lens composed of a negative lens and a positive lens. Further, it is preferable that the fourth lens unit is constructed so as to have a negative lens and a positive lens, totaling two lenses.

Numerical examples 1 to 3 of the invention are shown below. In the numerical examples 1 to 3, Ri is the radius of curvature of the i-th lens surface, when counted from the object side, Di is the i-th lens thickness or air separation, when counted from the object side, and Ni and $\nu i$ are respectively the refractive index and Abbe number of the glass of the i-th lens element, when counted from the object side. The shape of the aspheric surface is expressed in the coordinates with an X axis in the axial direction and an H axis in the direction perpendicular to the optical axis, the direction in which light advances being taken as positive, by the following equation:

$$X = (1/R)H^2/(1+(1-(H/R)^2)^{\frac{1}{2}}) + AH^2 + BH^4 + CH^6 + DH^8 + EH^{10}$$

where R is the radius of the osculating sphere and A, B, C, D and E are the aspheric coefficients.

Also, the relationship of each of the above-described conditions (1) to (5) and the various values in the numerical examples 1 to 3 is shown in Table 1.

Numerical Example 1 (FIGS. 2, 5(A), 5(B) and 5(C))
F = 5.15 − 14.55   FNo = 1:1.6 − 2.7   2ω = 75.7° − 30.7°

| R1 = 78.46 | D1 = 4.0 | N1 = 1.83400 | ν1 = 37.2 |
|---|---|---|---|
| R2 = 302.45 | D2 = 0.15 | | |
| R3 = 22.06 | D3 = 1.70 | N2 = 1.77250 | ν2 = 49.6 |
| R4 = 12.39 | D4 = 7.38 | | |
| R5 = 33.74 | D5 = 1.50 | N3 = 1.77250 | ν3 = 49.6 |
| R6 = 14.64 | D6 = Variable | | |
| R7 = −23.08 | D7 = 0.8 | N4 = 1.77250 | ν4 = 49.6 |
| R8 = 13.93 | D8 = 2.5 | N5 = 1.84666 | ν5 = 23.8 |
| R9 = 288.32 | D9 = Variable | | |
| R10 = 47.32 | D10 = 0.8 | N6 = 1.84666 | ν6 = 23.8 |
| R11 = 11.74 | D11 = 4.2 | N7 = 1.53172 | ν7 = 48.9 |
| R12 = −78.41 | D12 = 0.15 | | |
| R13 = 21.47 | D13 = 3.5 | N8 = 1.69680 | ν8 = 55.5 |
| R14 = −30.91 | D14 = Variable | | |
| R15 = Stop | D15 = 2.2 | | |
| R16 = −31.65 | D16 = 0.8 | N9 = 1.77250 | ν9 = 49.6 |
| R17 = 10.69 | D17 = 2.8 | N10 = 1.76182 | ν10 = 26.5 |
| R18 = 26.57 | D18 = Variable | | |
| R19 = 34.90 | D19 = 3.4 | N11 = 1.69680 | ν11 = 55.5 |
| R20 = −27.08 | D20 = 0.15 | | |
| R21 = 20.34 | D21 = 5.2 | N12 = 1.60311 | ν12 = 60.7 |
| R22 = −16.31 | D22 = 0.8 | N13 = 1.84666 | ν13 = 23.8 |
| R23 = −295.97 | D23 = Variable | | |
| R24 = ∞ | D24 = 6.0 | N14 = 1.51633 | ν16 = 64.1 |
| R25 = ∞ | | | |

| Focal | Variable Separations | | | | |
|---|---|---|---|---|---|
| Length | D6 | D9 | D14 | D18 | D23 |
| 5.15 | 11.12 | 14.94 | 2.74 | 14.26 | 2.00 |
| 9.37 | 17.55 | 1.60 | 9.65 | 7.35 | 8.91 |
| 14.55 | 12.69 | 1.86 | 14.25 | 2.75 | 13.51 |

Bf = 10.54   $f_1$ = −20.908
$f_2$ = −32.092   $f_3$ = 19.005
$f_4$ = −18   $f_5$ = 15.577

Numerical Example 2 (FIGS. 3, 6(A), 6(B) and 6(C))
F = 5.15 − 14.55   FNo = 1:1.6 − 2.7   2ω = 75.7° − 30.7°

| R1 = 75.43 | D1 = 4.0 | N1 = 1.83400 | ν1 = 37.2 |
|---|---|---|---|
| R2 = 289.18 | D2 = 0.15 | | |
| R3 = 25.71 | D3 = 1.70 | N2 = 1.77250 | ν2 = 49.6 |
| R4 = 13.04 | D4 = 6.86 | | |
| R5 = 45.22 | D5 = 1.50 | N3 = 1.77250 | ν3 = 49.6 |
| R6 = 17.66 | D6 = Variable | | |
| R7 = −22.78 | D7 = 0.8 | N4 = 1.77250 | ν4 = 49.6 |
| R8 = 14.99 | D8 = 2.5 | N5 = 1.84666 | ν5 = 23.8 |
| R9 = 125.78 | D9 = Variable | | |
| R10 = 61.26 | D10 = 0.8 | N6 = 1.84666 | ν6 = 23.8 |
| R11 = 14.00 | D11 = 4.2 | N7 = 1.53172 | ν7 = 48.9 |
| R12 = −39.38 | D12 = 0.15 | | |
| R13 = 22.13 | D13 = 3.5 | N8 = 1.69680 | ν8 = 55.5 |
| R14 = −44.02 | D14 = Variable | | |
| R15 = Stop | D15 = 2.2 | | |
| R16 = −35.35 | D16 = 0.8 | N9 = 1.77250 | ν9 = 49.6 |
| R17 = 10.95 | D17 = 2.8 | N10 = 1.76182 | ν10 = 26.5 |
| R18 = 30.17 | D18 = Variable | | |
| R19 = 34.11 | D19 = 3.4 | N11 = 1.69680 | ν11 = 55.5 |
| R20 = −27.34 | D20 = 0.15 | | |
| R21 = 21.96 | D21 = 5.2 | N12 = 1.60311 | ν12 = 60.7 |
| R22 = −15.61 | D22 = 0.8 | N13 = 1.84666 | ν13 = 23.8 |
| R23 = −286.33 | D23 = Variable | | |
| R24 = ∞ | D24 = 6.0 | N14 = 1.51633 | ν14 = 64.1 |
| R25 = ∞ | | | |

| Focal | Variable Separations | | | | |
|---|---|---|---|---|---|
| Length | D6 | D9 | D14 | D18 | D23 |
| 5.15 | 13.51 | 14.87 | 2.70 | 13.01 | 2.00 |
| 9.49 | 17.36 | 2.49 | 10.03 | 6.73 | 9.48 |
| 14.55 | 11.84 | 2.32 | 14.92 | 2.54 | 14.47 |

Bf = 10.53   $f_1$ = −21.565
$f_2$ = −27.799   $f_3$ = 19.201
$f_4$ = −20.306   $f_5$ = 16.178

Numerical Example 3 (FIGS. 4, 7(A), 7(B) and 7(C))
F = 5.15 − 14.55   FNo = 1:1.6 − 2.7   2ω = 75.7° − 30.7°

| R1 = 22.41 | D1 = 1.70 | N1 = 1.77250 | ν1 = 49.6 |
|---|---|---|---|
| R2 = 12.85 | D2 = 6.56 | | |
| R3 = 30.99 | D3 = 1.50 | N2 = 1.77250 | ν2 = 49.6 |
| R4 = 16.82 | D4 = Variable | | |
| R5 = −15.72 | D5 = 0.80 | N3 = 1.77250 | ν3 = 49.6 |
| R6 = 16.39 | D6 = 2.50 | N4 = 1.84666 | ν4 = 23.8 |
| R7 = −100.96 | D7 = Variable | | |
| R8 = 80.74 | D8 = 0.80 | N5 = 1.84666 | ν5 = 23.8 |
| R9 = 13.92 | D9 = 4.20 | N6 = 1.53172 | ν6 = 48.9 |
| R10 = −33.87 | D10 = 0.15 | | |
| R11 = 22.34 | D11 = 3.50 | N7 = 1.69680 | ν7 = 55.5 |
| R12 = −44.73 | D12 = Variable | | |
| R13 = Stop | D13 = 2.20 | | |
| R14 = −47.16 | D14 = 0.80 | N8 = 1.77250 | ν8 = 49.6 |
| R15 = 12.03 | D15 = 2.80 | N9 = 1.76182 | ν9 = 26.5 |
| R16 = 27.14 | D16 = Variable | | |
| R17 = 35.49 | D17 = 3.40 | N10 = 1.69680 | ν10 = 55.5 |
| R18 = −26.64 | D18 = 0.15 | | |
| R19 = 21.43 | D19 = 5.20 | N11 = 1.60311 | ν11 = 60.7 |
| R20 = −16.52 | D20 = 0.80 | N12 = 1.84666 | ν12 = 23.8 |
| R21 = 373.22 | D21 = Variable | | |
| R22 = ∞ | D22 = 6.00 | N13 = 1.51633 | ν13 = 64.1 |
| R23 = ∞ | | | |

| Focal | Variable Separations | | | | |
|---|---|---|---|---|---|
| Length | D4 | D7 | D12 | D16 | D21 |
| 5.15 | 12.92 | 14.68 | 2.74 | 14.80 | 2.0 |
| 9.38 | 19.33 | 1.67 | 9.35 | 6.79 | 10.01 |
| 14.55 | 15.02 | 1.57 | 13.75 | 1.45 | 15.35 |

Bf = 10.67   $f_1$ = −21.253
$f_2$ = −28.239   $f_3$ = 19.602
$f_4$ = −21.592   $f_5$ = 16.838

*1st Surface: Aspherical
Aspheric Coefficients
A = 0
B = 1.541 × $10^{-5}$
C = 5.353 × $10^8$
D = −4.130 × $10^{-10}$
E = 2.303 × $10^{-12}$

TABLE 1

| Condition | Numerical Example | | |
|---|---|---|---|
| | 1 | 2 | 3 |
| (1) $|f1/FT|$ | 1.44 | 1.48 | 1.46 |
| (2) X4/X3 | 0 | 0.14 | 0 |
| (3) X5/X3 | 1 | 0.88 | 1.21 |
| (4) $|f2/FW|$ | 6.23 | 5.40 | 5.48 |
| (5) $|f4/FW|$ | 3.50 | 3.94 | 4.19 |

According to the invention, by properly setting the refractive powers of the five lens units and the conditions of the movements with variation of the magnification, while the bulk and size of the entire lens system is minimized, a wide-angle zoom lens of as wide view angles as 76°−31°, a ratio of magnification variation of 3, an F-number of about 1.6–2.7 having a high optical performance over the entire range of variation of the magnification can be achieved.

What is claimed is:

1. A wide-angle zoom lens comprising: from an object side to an image side, a first lens unit of negative refractive power, a second lens unit of negative refractive power, a third lens unit of positive refractive power, a fourth lens unit of negative refractive power and a fifth lens unit of positive refractive power, variation of the magnification from a wide-angle end to a telephoto end being performed by moving said second lens unit so as to have a locus of convex shape toward the image side and by moving said third lens unit and said fifth lens unit toward the object side, wherein said first and fourth lens units each remain stationary during zooming.

2. A wide-angle zoom lens according to claim 1, wherein letting the focal length of said first lens unit be denoted by f1, the focal length of the entire lens system in the telephoto end by FT, and the amount of movement of the i-th lens unit when varying the magnification from the wide-angle end to the telephoto end by Xi, the following conditions are satisfied:

$$0.5 < |f1/FT| < 2$$

$$0 \leq X4/X3 < 1$$

$$0.5 < X5/X3 < 2$$

3. A wide-angle zoom lens according to claim 1, satisfying the following conditions:

$$4 < |f2/Fw| < 8$$

$$3 < |f4/Fw| < 6$$

where f2 and f4 are the focal lengths of said second lens unit and said fourth lens unit, respectively, and Fw is the focal length of the entire lens system in the wide-angle end.

4. A wide-angle zoom lens according to claim 1, wherein said first lens unit has at least one aspheric lens surface of such shape that the positive refractive power gets progressively stronger toward the margin of the lens surface.

5. A wide-angle zoom lens comprising:
from an object side to an image side,
a first lens unit having a negative refractive power;
a second lens unit having a negative refractive power;
a third lens unit having a positive refractive power;
a fourth lens unit having a negative refractive power; and
a fifth lens unit having a positive refractive power,
zooming being performed by moving at least said second, third and fifth lens units,
wherein said first and fourth lens units each remain stationary during zooming.

6. A wide-angle zoom lens according to claim 5, wherein letting the focal length of said first lens unit be denoted by f1, the focal length of the entire lens system in the telephoto end by FT, and the amount of movement of the i-th lens unit when varying the magnification from the wide-angle end to the telephoto end by Xi, the following conditions are satisfied:

$$0.5 < |f1/FT| < 2$$

$$0 \leq X4/X3 < 1$$

$$0.5 < X5/X3 < 2$$

7. A wide-angle zoom lens according to claim 5, satisfying the following conditions:

$$4 < |f2/Fw| < 8$$

$$3 < |f4/Fw| < 6$$

where f2 and f4 are the focal lengths of said second lens unit and said fourth lens unit, respectively, and Fw is the focal length of the entire lens system in the wide-angle end.

8. A wide-angle zoom lens according to claim 5, wherein said first lens unit has at least one aspheric lens surface of such shape that the positive refractive power gets progressively stronger toward the margin of the lens surface.

9. A wide-angle zoom lens comprising: from an object side to an image side, a first lens unit of negative refractive power, a second lens unit of negative refractive power, a third lens unit of positive refractive power, a fourth lens unit of negative refractive power and a fifth lens unit of positive refractive power, variation of the magnification from a wide-angle end to a telephoto end being performed by moving said second lens unit so as to have a locus of convex shape toward the image side and by moving said third lens unit and said fifth lens unit toward the object side, wherein said first lens unit remains stationary during zooming, and said fourth lens unit moves during zooming.

10. A wide-angle zoom lens comprising:
from an object side to an image side,
a first lens unit having a negative refractive power;
a second lens unit having a negative refractive power;
a third lens unit having a positive refractive power;
a fourth lens unit having a negative refractive power; and
a fifth lens unit having a positive refractive power,
zooming being performed by moving at least said second, third and fifth lens units,
wherein said first lens unit remains stationary during zooming, and said fourth lens unit moves during zooming.

11. A wide-angle zoom lens comprising:
from an object side to an image side,
a first lens unit having a negative refractive power;
a second lens unit having a negative refractive power;
a third lens unit having a positive refractive power;

a fourth lens unit having a negative refractive power; and a fifth lens unit having a positive refractive power;

zooming being performed by moving at least said second, third and fifth lens units, wherein zooming from a wide-angle end to a telephoto end is performed by moving said second lens unit in a locus convex toward the image side and by moving said third and fifth lens unit toward the object side.

* * * * *

UNITED STATES PATENT AND TRADEMARK OFFICE
CERTIFICATE OF CORRECTION

PATENT NO. : 5,253,113
DATED : October 12, 1993
INVENTOR(S) : MAKOTO SEKITA, ET AL.

It is certified that error appears in the above-indentified patent and that said Letters Patent is hereby corrected as shown below:

COLUMN 3:
   Line 37, "whole" (second occurrence) should be deleted.
   Line 44, "units," should read --unit,--.

COLUMN 6:
   Line 57, "2.0" should read --2.00--.
   Line 65, "C = 5.353 x $10^8$" should read
--C = 5.353 x $10^{-8}$--.

Signed and Sealed this

Twenty-seventh Day of September, 1994

Attest:

BRUCE LEHMAN

*Attesting Officer*       *Commissioner of Patents and Trademarks*